United States Patent
Lee et al.

(10) Patent No.: US 7,376,193 B2
(45) Date of Patent: May 20, 2008

(54) METHOD FOR ADAPTIVELY ALLOCATING RESOURCES IN COMMUNICATION SYSTEM

(75) Inventors: Yong Hoon Lee, Daejon (KR); Inhyoung Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 821 days.

(21) Appl. No.: 10/650,152

(22) Filed: Aug. 27, 2003

(65) Prior Publication Data

US 2004/0120347 A1   Jun. 24, 2004

(30) Foreign Application Priority Data

Dec. 21, 2002   (KR) .............. 10-2002-0082211

(51) Int. Cl.
*H04L 27/28* (2006.01)
(52) U.S. Cl. ...................................... 375/260
(58) Field of Classification Search ............... 375/259, 375/260, 267, 295, 299
See application file for complete search history.

(56) References Cited

U.S. PATENT DOCUMENTS 5,479,447 A      12/1995   Chow et al.
2006/0083210 A1*  4/2006   Li et al. .................. 370/343

OTHER PUBLICATIONS

Cheong Yui Wong, et al. Multiuser OFDM With Adaptive Subcarrier, but, and Power Allocation; IEEE Journal on Selected Areas in Communications, vol. 17, No. 10, Oct. 1999, pp. 1747-1758.
Wonjong Rhee et al., Increase in Capacity of Multiuser OFDM System Using Dynamic Subchannel Allocation; (0-7803-5718-3/00, 2000 IEEE, pp. 1085-1089).
C.Y. Wong et al., Use of Linear Programming for Dynamic Subcarrier and Bit Allocation in Multiuser OFDM, Telecommunications Review Dec. 4, 2002 (p. 526) (pp. 513-526).

* cited by examiner

*Primary Examiner*—David B. Lugo
(74) *Attorney, Agent, or Firm*—Blakely Sokoloff Taylor & Zafman

(57) ABSTRACT

A method for adaptively allocating resource can be simply implemented for reducing degradation of performance by effectively separating operations of sub-channel and time slot allocation and selection of modulation method and sequentially processing each of operations. A method for adaptively allocating resource in a communication system to sequentially process sub-carrier/time slot allocation and modulation method selection efficiently includes the step of a) computing average channel gains of sub-carriers/time slots for each user by using channel gains of sub-carriers/time slots for each user; b) computing average numbers of bits for each user by using required data rates and average channel gains of sub-carriers/time slots for each user; c) computing the number of sub-carriers/time slots allocated to each user and allocating the sub-carriers/time slots to each user; and d) selecting a modulation method with respect to each sub-carrier/time slot.

8 Claims, 8 Drawing Sheets

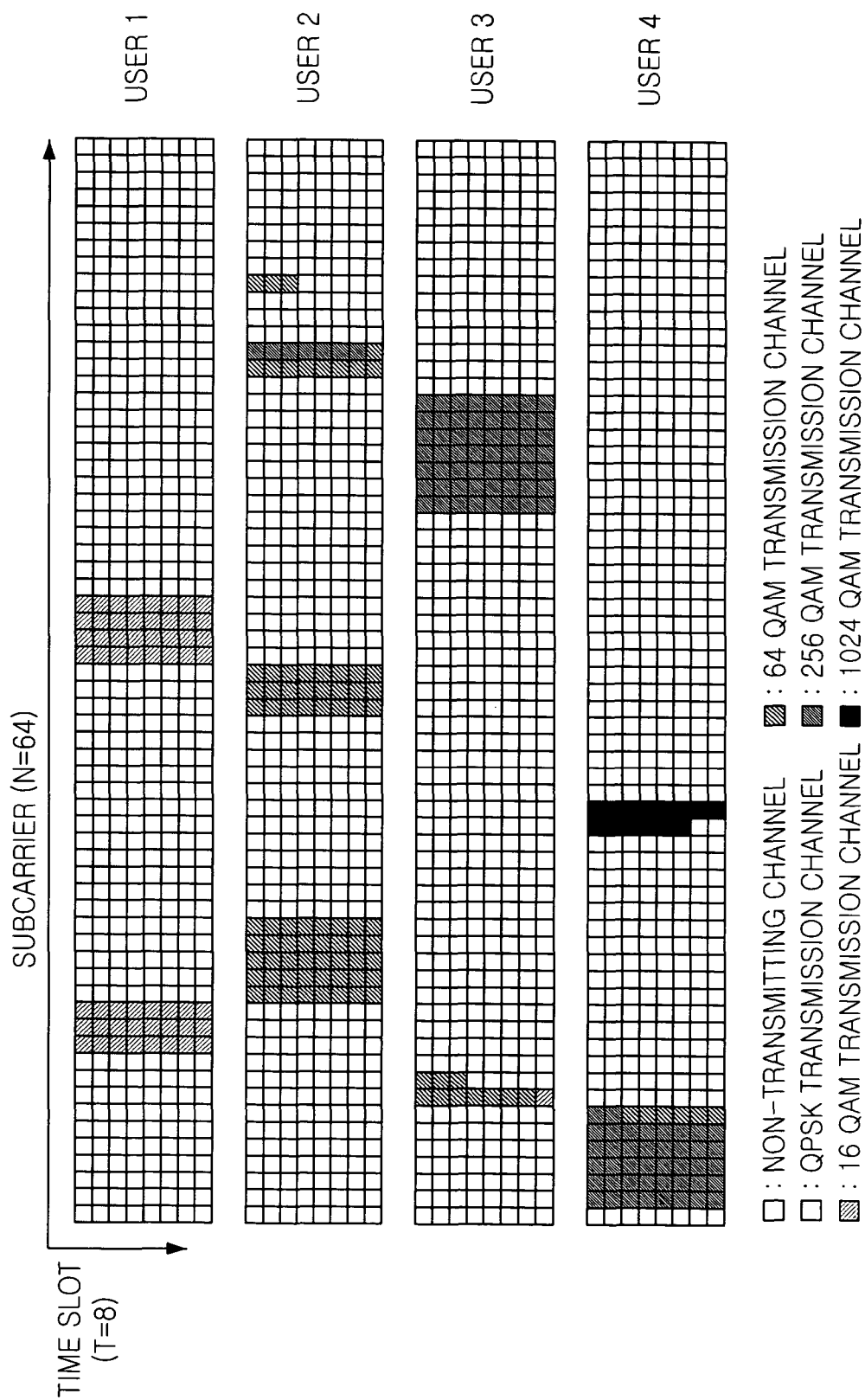

METHOD FOR ADAPTIVELY ALLOCATING RESOURCES IN COMMUNICATION SYSTEM

FIELD OF THE INVENTION

The present invention relates to a method for adaptively allocating resources in a communication system; and, more particularly to a method for adaptively allocating resources in an orthogonal frequency division multiple access (OFDMA)/time division multiple access (TDMA) system and a computer readable medium on which a program for executing the same method is recorded.

DESCRIPTION OF THE PRIOR ART

Recently, transmission of data and video through the Internet has been popular and transmission amount of data and video also incredibly increased. Accordingly, a high-speed data transmission also has been demanded. For transmission of data and video in high speed, a frequency has to be used effectively.

However, the frequency is shared by each of users in an orthogonal frequency division multiple access (OFDMA) system. Thus, it has to be considered to use a time division multiple access (TDMA) for allocating resources in the OFDMA system in order to increase flexibility of resource allocation and reduce waste caused by a pilot signal when the number of users increases. It is referred to as a hybrid OFDMA/TDMA system in this specification.

A typical OFDM system uses the same modulation method for every sub-carrier regardless of a magnitude of a channel response provide from each sub-carrier. The hybrid OFDMA/TDMA system also allocates users with an arbitrary sub-carrier and an arbitrary time slot regardless of the magnitude of each user's channel response.

When the channel response of each sub-carrier in the transmitter is estimated, the OFDM system properly divides power so that a power gain can be obtained by using a different modulation method to each sub-carrier according to the channel response.

Also, if proper time slots and sub-carriers are allocated in the OFDM system by considering the channel response of each user and the adaptive selection of modulation method, an additional power gain can be obtained.

However, the above described methods are too complicated to be implemented because the allocation of time slot and sub-channel of each user and the selection of modulation method for the allocation are simultaneously operated in the hybrid OFDMA/TDMA.

SUMMARY OF THE INVENTION

It is, therefore, an object of the present invention to provide a method for adaptively allocating resources which can be simply implemented for reducing degradation of performance by effectively separating operations of sub-channel and time slot allocation and selection of modulation method and sequentially processing each of operations.

Also, it is another object of the present invention to provide a computer readable recording medium on which a program for executing the same method is recorded.

In accordance with an aspect of the present invention, there is provided a computer readable recording medium for storing instructions for executing a method for adaptively allocating resource in a communication system including a microprocessor by subsequently processing sub-carrier/time slot allocation and modulation method selection, comprising the methods of: a) computing average channel gains of sub-carriers/time slots for each user by using channel gains of sub-carriers/time slots for each user; b) computing average numbers of bits for each user by using required data rates and average channel gains of sub-carriers/time slots for each user; c) computing the number of sub-carriers/time slots allocated to each user and allocating the sub-carriers/time slots to each user; and d) selecting a modulation method with respect to each sub-carrier/time slot.

In accordance with another aspect of the present invention, there is provided a computer readable recording medium including a microprocessor for allocating an adaptive source in a communication system, including the instructions of: a) computing average channel gains of sub-carriers/time slots for each user by using channel gains of sub-carriers/time slots for each user; b) computing average numbers of bits for each user by-using required data rates and average channel gains of sub-carriers/time slots for each user; c) computing the number of sub-carriers/time slots allocated to each user and allocating the sub-carriers/time slots to each user; and d) selecting a modulation method with respect to each sub-carrier/time slot.

BRIEF DESCRIPTION OF THE DRAWINGS

The above and other objects and features of the present invention will become apparent from the following description of the preferred embodiments given in conjunction with the accompanying drawings, in which:

FIG. 6 is an exemplary drawing showing results of users selected different methods of modulation in accordance with the present invention.

DETAILED DESCRIPTION OF THE INVENTION

Other objects and aspects of the invention will become apparent from the following description of the embodiments with reference to the accompanying drawings, which is set forth hereinafter.

Figure 1A:
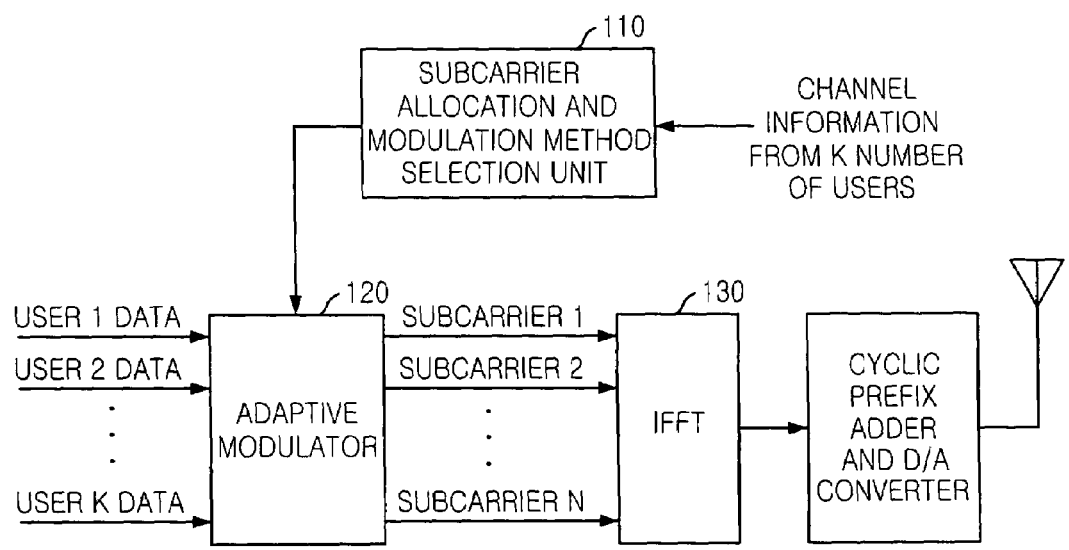
FIG. 1A is a block diagram showing an adaptive resource allocator in a transmitter of a base station in accordance with the present invention.
Figure 1B:
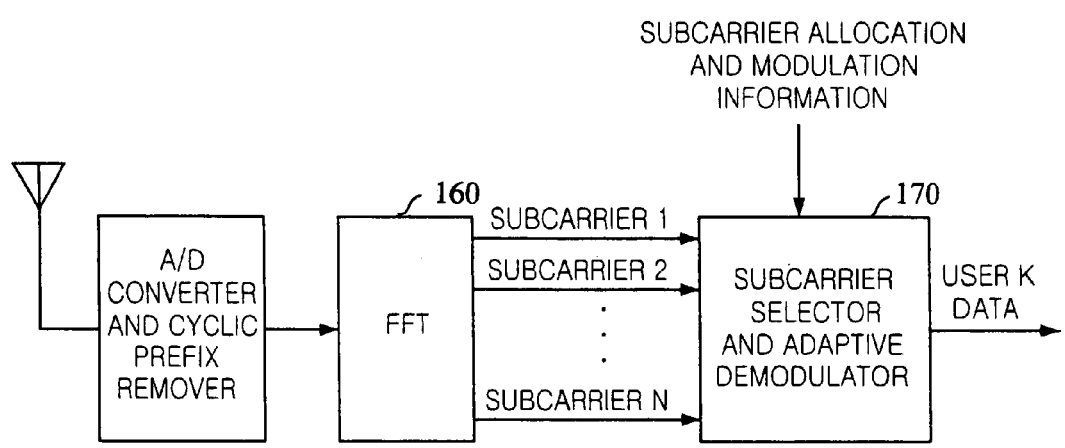
FIG. 1B is a block diagram illustrating an adaptive resource allocator in a receiver of a mobile terminal in accordance with the present invention.

FIG. 1A is a block diagram showing an adaptive resource allocator in a transmitter of a base station in accordance with the present invention. FIG. 1B is a block diagram illustrating adaptive resource allocator in a receiver of a mobile terminal, especially, a k-th mobile terminal in accordance with the present invention.

Referring to FIGS. 1A and 1B, an inverse fast fourier transformer (IFFT) 130 and a fast fourier transformer (FFT)

160 of a typical orthogonal frequency division multiplexing (OFDM) or orthogonal frequency division multiple access (OFDMA) system, is used in the transmitter and the receiver of the present invention.

Signals transmitted from the IFFT 130 of the transmitter to the FFT 160 of the receiver are sub-carriers and each sub-carrier channel can be easily modeled by multiplying a channel gain without interference.

That is, a K-th signal of the FFT 160 is obtained by multiplying a K-th signal of the IFFT 130 and a channel gain of the K-th signal, which is different for each sub-carrier.

Therefore, if the channel gain of the each sub-carrier is obtained, the transmitter can send more data on a sub-carrier having a large channel gain and send less data on a sub-carrier having a small channel gain. This scheme is an adaptive modulation.

In the OFDMA system, different users can transmit data on different sub-carriers and time slots and in the OFDMA system using a fixed resource allocation, users can transmit data on arbitrarily sub-carriers and time slots.

However, the channel gains are different among each sub-carrier and also different among each user. That is, in order to have more power gain, a better channel can be allocated to a user considering the channel gain because the user may have a small channel gain on one channel and may have a large channel gain on other channel.

It is explained that a hybrid orthogonal frequency division multiple access (OFDMA)/time division multiple access (TDMA) system has the same problem of the OFDMA system and a method for adaptive allocation of sub-carriers and adaptive modulation is suggested in the specification of the present invention.

Referring to FIG. 1A, the hybrid OFDMA system includes a sub-carrier allocation and modulation method selection unit 110. An adaptive modulator 120 is coupled to the sub-carrier allocation and modulation method selection unit 110 and modulates user data adaptively according to the data received from the sub-carrier allocation and modulation method selection unit 110.

Referring to FIG. 1B, sub-carrier allocation and modulation information are transferred to a sub-carrier selector and adaptive demodulator 170 through a control channel for sub-carrier selection and adaptive demodulation.

Figure 2:
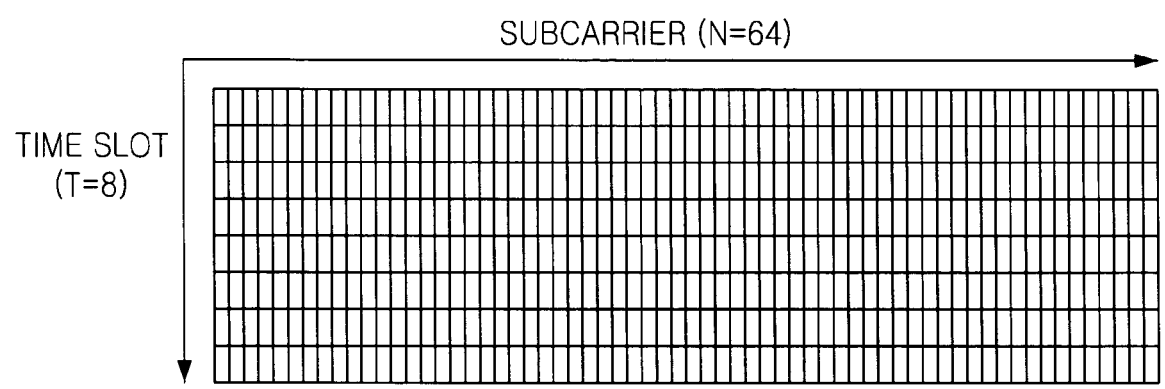
FIG. 2 is a conceptual view of resources to be used by users in a hybrid OFDMA/TDMA system.

FIG. 2 is a conceptual view of resources to be used by users in the hybrid OFDMA/TDMA system.

Referring to FIG. 2, it will be described in detail that the problem of adaptive resource allocation of the hybrid OFDMA/TDMA system is similar to that of the OFDMA system.

As shown in FIG. 2, in case that the number of time slots is T and the number of sub-carriers is N, the number of available resources becomes NT.

When K number of users are transmitting data through NT number of resources, it is determined how the NT number of resources are allocated to K number of users, what kind of modulation method is used and how much power is used to transmit the data in accordance with the present invent. It is assumed that the hybrid OFDMA/TDMA has NT number of sub-carriers because data are independently transmitted on sub-carriers and time slots. It is also assumed that T sets of N number of channel gains are the same because the channel gains of the hybrid OFDMA/TDMA in accordance with the present invention are time-invariant. Therefore, the hybrid OFDMA/TDMA in accordance with the present invention can be assumed as the OFDMA system that has NT number of sub-carriers.

Figure 3:
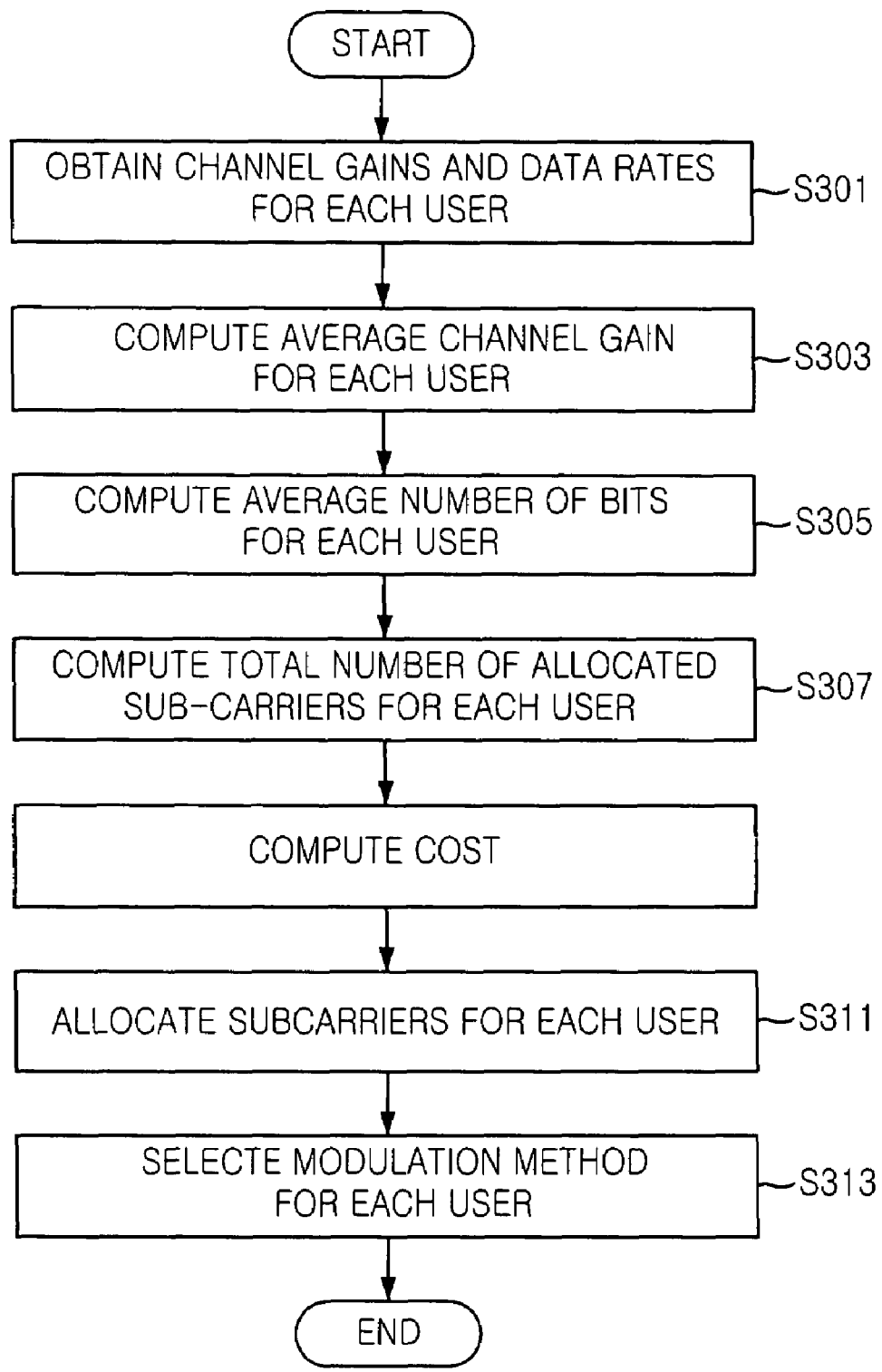
FIG. 3 is a flowchart for explaining a method for adaptively allocating resource in a communication system in accordance with a preferred embodiment of the present invention.
Figure 4A:
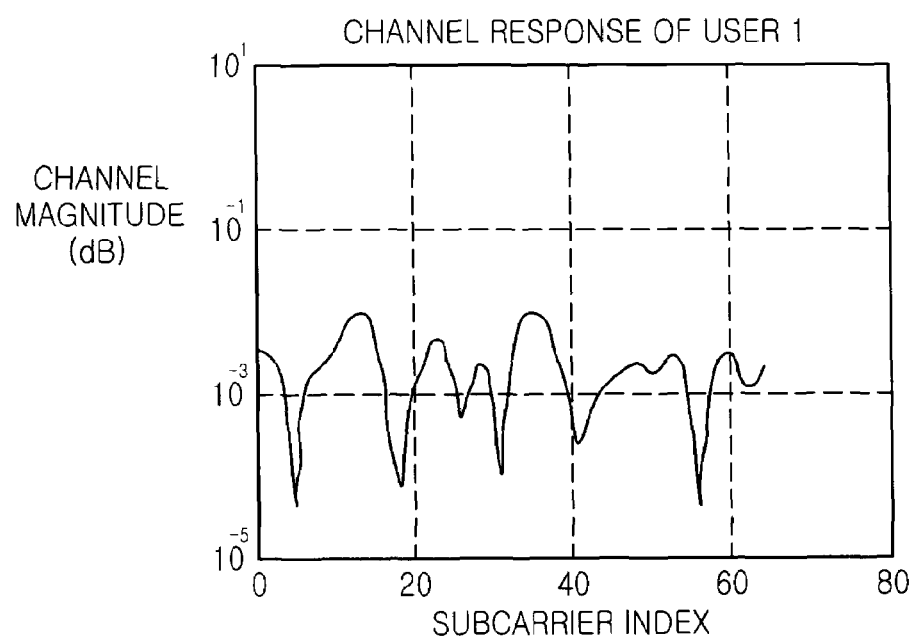
FIGS. 4A to 4D are graphs showing channel responses of user in accordance with another preferred embodiment of the present invention.
Figure 4B:
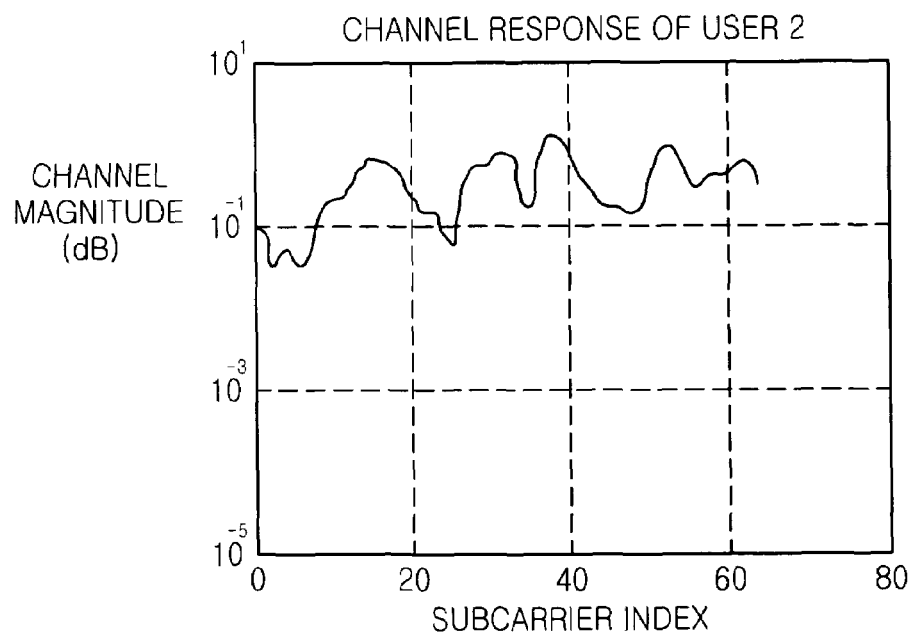
Figure 4C:
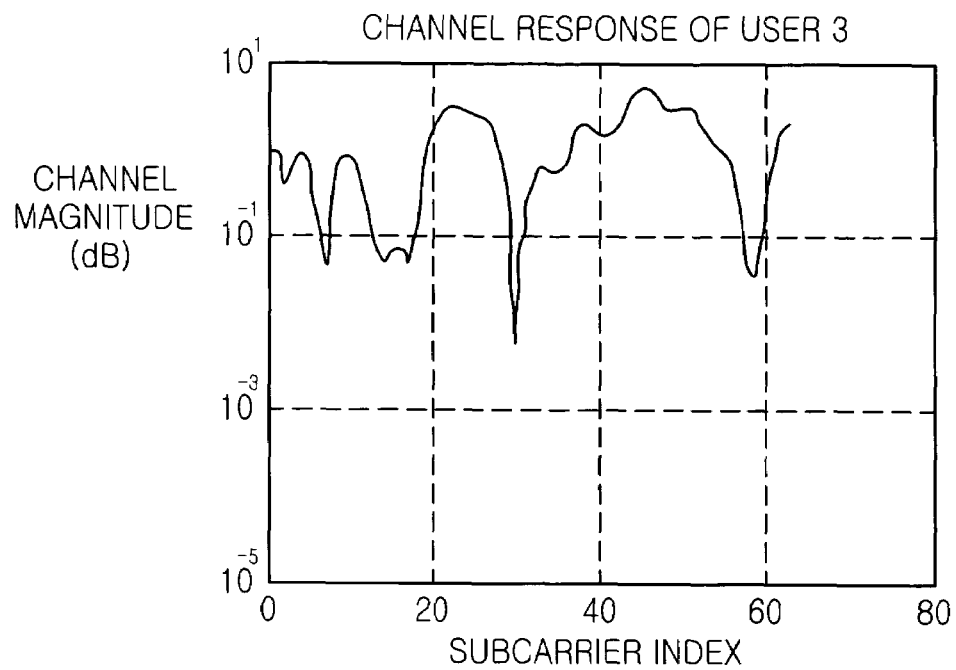
Figure 4D:
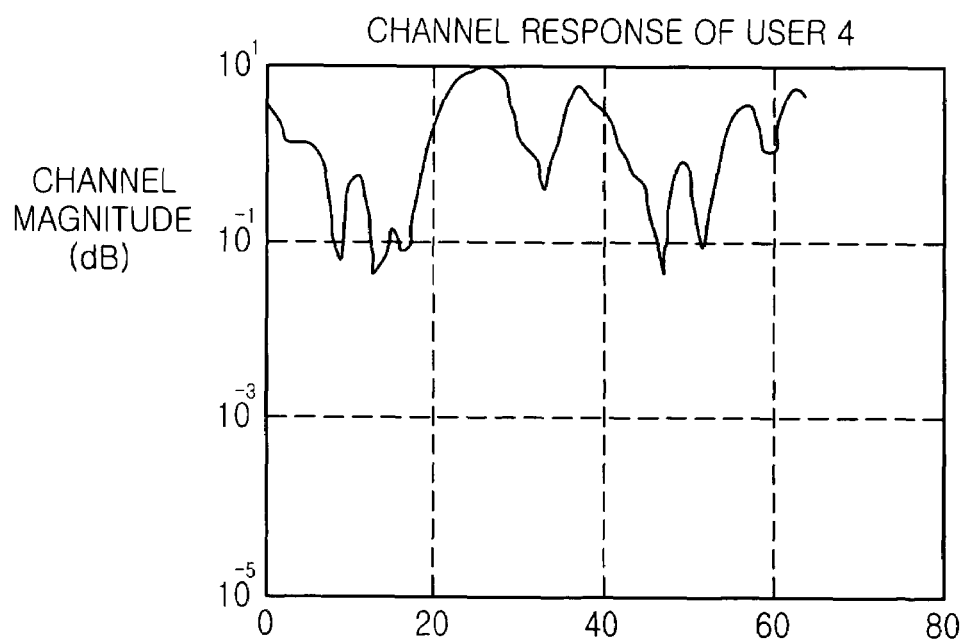

FIG. 3 is a flowchart for explaining a method for adaptively allocating resource in a communication system in accordance with a preferred embodiment of the present invention.

At Step S301, when it is assumed there are K numbers of users and N numbers of sub-carriers, channel gains $\alpha^2_{k,n}$ (k=1, ..., K, n=1, ..., N) of sub-carriers for each user and data rates $R_k$ (k=1, ..., K) for each user are obtained.

An N is a multiple of the number of channels and the number of time slots in the hybrid OFDMA/TDMA system.

A channel gain is obtained by estimating the channel and a required data rate is obtained by exchanging information between a base station and a mobile terminal.

At Step S303, average channel gains of sub-carriers for each user are computed by using the channel gains of sub-carriers for each user in accordance with following equation 1.

$$\overline{\alpha}_k^2 = \frac{1}{N}\sum_{n=1}^{N} \alpha^2_{k,n}, \text{ for } k = 1 \ldots K \qquad \text{[Equation 1]}$$

At Step S305, average numbers of bits $\overline{c}_k$ for each user are computed by using the average channel gains and the required data rates for each user.

$\overline{c}_k$ is obtained from below equation 2 formulated by adding a proper assumption into an optimal solution disclosed in an article by C. Y. Wong, et al, "Multiuser OFDM with Adaptive Sub-carrier, Bit, and Power Allocation," IEEE Journal of Selected Areas on Communcations, pp. 1743~1758, 1999.

$$\frac{\overline{c}_k f'(\overline{c}_k) - f(\overline{c}_k)}{\overline{\alpha}_k^2} = \varepsilon, \text{ for } k = 1, \ldots K \qquad \text{[Equation 2]}$$

$$\sum_{k=1}^{K} R_k/\overline{c}_k = N$$

Although the number of bits for each sub-carrier is computed by using the channel gain of each sub-carrier in the prior optimal solution, the number of bits for each sub-carrier is computed by using the average channel gain of sub-carrier for each user in the equation 2. Therefore, the sub-carriers allocation is taken apart from bits allocation.

In the equation 2, $f(c)$ is the power to receive data within a bit error rate of c bits.

The power $f(c)$ varies in accordance with methods of modulation, e.g., quadrature amplitude modulation (QAM), phase shift keying (PSK), pulse amplitude modulation (PAM). In case of QAM, the power $f(c)$ is described as equation 3.

$$f(c)=N_0[Q^{-1}(p_e/4)]^2(2^c-1)/3 \qquad \text{[Equation 3]}$$

In the equation 3, $N_0/2$ is a variance of white gauss noise, $p_e$ is a bit error rate, and $Q(x)$ is a Q function.

The equation 3 is a convex function, which can be applied to QAM, PSK, and PAM.

If a non-linear equation with K+1 equations and variables of the equation 2 is a convex function, there always exist an optimal solution. Therefore, $\overline{c}_k$ can be obtained by a Newton method disclosed by K. E. Atkinson, Numerical Analysis, Wiley & Sons Inc., 1998.

At Step S307, a total number of sub-carriers for each user is computed by equation 4. A total number of bits is $R_k$ in below equation 4.

$$n_k = R_k/\overline{c_k}, \text{ for } k=1, \ldots, K \quad \text{[Equation 4]}$$

If the average number of bits $\overline{c_k}$ from the equation 2 and the number of sub-carriers $n_k$ of each user from the equation 4 are substituted into the optimal solution, a simplified optimal solution is obtained as equation 5.

$$\text{Minimize } P_i - \sum_{k=1}^{K} \sum_{n=1}^{N} r_{k,n} \rho_{k,n} \quad \text{[Equation 5]}$$

$$\text{Subject to } \sum_{n=1}^{N} \rho_{k,n} = n_k, \text{ for all } k$$

$$\sum_{k=1}^{K} \rho_{k,n} = 1, \text{ for all } n$$

In the equation 5, $\rho_{k,n}$ is a binary variable, which shows if the K-th user uses the n-th sub-carrier. The value is 1 for using and 0 for not using.

That is, at step S311, the sub-carriers are allocated by solving the optimal solution of the equation 5.

An $r_{k,n}$ of the equation 5 is the cost for the K-th user to use the n-th sub-carrier, and this relationship is further described in the below equation 6.

$$r_{k,n} = f(\overline{c_k})/\alpha^2_{k,n}, \text{ for } k=1, \ldots, K \text{ and } n=1, \ldots, N \quad \text{[Equation 6]}$$

Equation 5 is basically an integer type optimal solution because of the binary variable $\rho_{k,n}$. Although the computation is complicated to obtain the integer type optimal solution, the equation 5 is a particular solution, which can be solved with the integer condition of $\rho_{k,n}$ removed.

Although the optimal solution can be solved with a Simplex method, it can not be practically implemented in real time.

When the optimal solution of the equation 5 is reviewed for minimizing the complexity, it is regarded as a transportation problem which is a particular solution of a linear optimal problem. In this case, N sub-carriers are suppliers and K users are consumers. The first constraint is that each consumer demands $n_k$ items. The second constraint is that all suppliers supply only one item.

This type of transportation problem becomes a very simple computation with Vogel's method. The solution has small performance degradation compared to the optimal solution. The Simplex Method and the Vogel's Method are disclosed by W. L. Winston, entitled *Operations Research, Duxbury Press*, 1994.

At Step S311, the sub-carriers are allocated to each user by the equation 5 and at Step S313, a modulation method for each user is selected.

Once the sub-carrier allocation is finished, a condition that a plurality of users transmits data on one sub-carrier is removed. Then, bits are allocated on the allocated channel of each user by using the modulation method for an individual OFDM user.

The sub-carrier allocation and the modulation method selection are described in the preferred embodiment of the present invention. Those skilled in the art will also obviously find out that the allocation and the modulation method selection for time slots are performed in the same manner as those for the sub-carrier.

Figure 5:
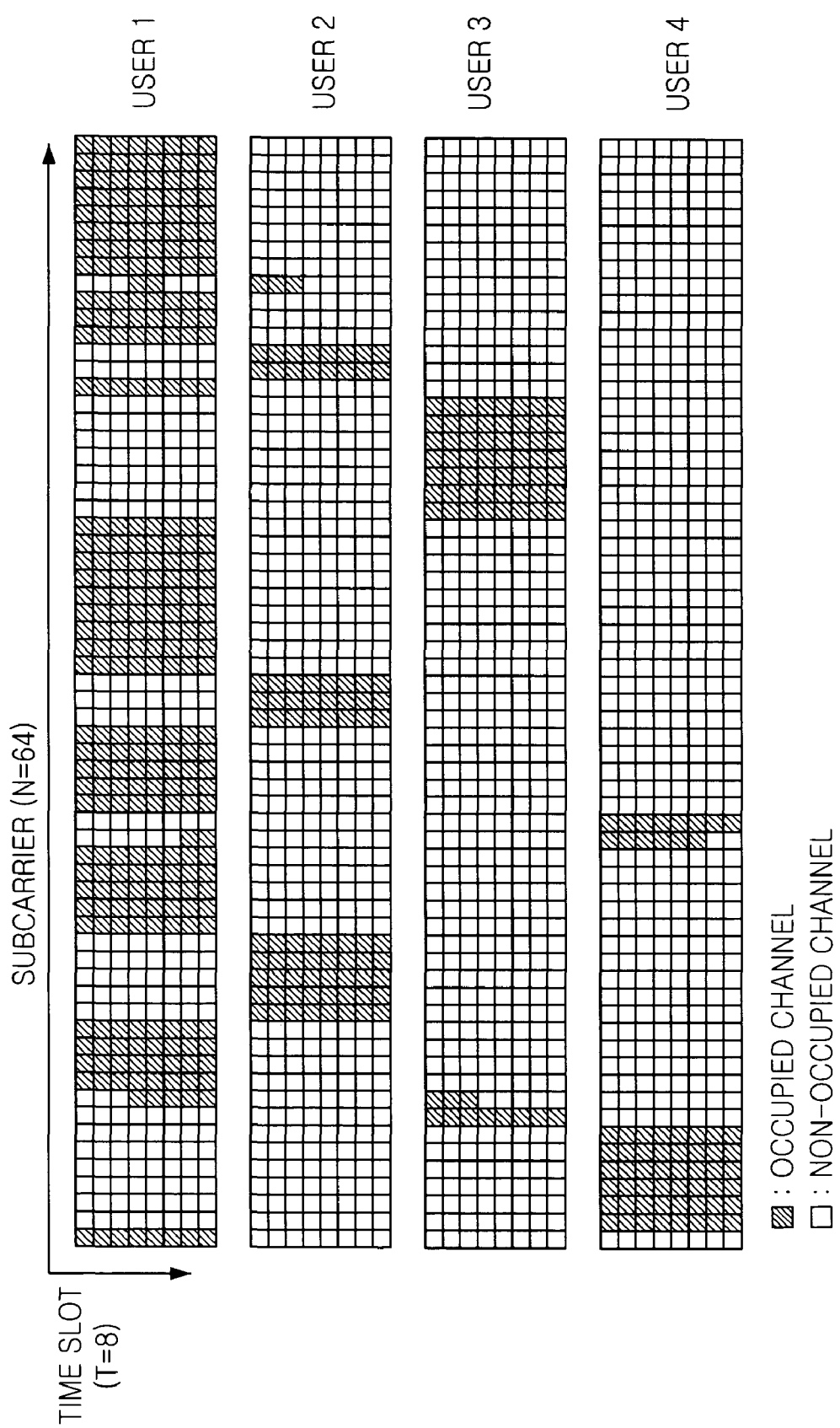
FIG. 5 is an exemplary drawing showing results of sub-carrier allocations in accordance with the present invention.

FIGS. 4 to 6 are graphs for describing the preferred embodiment of the present invention, wherein there are 4 users, 64 sub-carriers, and 8 time slots.

FIGS. 4A to 4D are graphs showing channel responses of user in accordance with another preferred embodiment of the present invention.

Each user has a different average channel gain in accordance with a distance estimated from the base station. The average channel gains of each user are shown as 0.0025, 0.3922, 1.3452 and 2.2601 in the preferred embodiment of the present invention.

As shown in FIGS. 4A to 4D, the sub-carriers have different values according to each user, but the values do not vary with the time slots. Therefore, the channel response of the first channel for user 1 is the same value with respect to the time slots 1 to 8. Total numbers of allocated channels for each of the 4 users computed from the equation 1 to 4 are 297, 83, 67, 62, respectively. The total number of channels is multiple of the number of sub-carriers and the number of time slots, which is 512.

The user 1 has a relatively large number 297 of the sub-carriers because the user 1 has a low average channel response 0.0025. The user 4 has the least number 62 of the sub-carriers because the user 4 has the highest average channel response 2.2601.

The optimal solution of the equation 5 can be solved with these numbers of the allocated sub-carriers of each user.

FIG. 5 is an exemplary drawing showing results of sub-carrier allocations in accordance with the present invention.

The dark mark shows the allocated channel to the user and the white mark shows the channel which is not allocated to the user.

FIG. 6 is an exemplary drawing showing results of users selected different methods of modulation in accordance with the present invention.

The white mark represents the channel which bits are not allocated while the dark mark represents the channel which bits are allocated. Particularly, the darker marks, the more bits are allocated in the channel. QPSK is 2 bits transmission and 16QAM is 4 bits transmission.

Comparing FIGS. 5 and 6, the bits are allocated on each user's allocated sub-carrier in accordance with a magnitude of the sub-carriers. The users having a large average channel gain are allocated with the small number of sub-carriers, which transmit the large number of bits. The user 1 is allocated with the large number of sub-carriers and using low order modulation methods because of a poor channel response.

All users have channels which may not have any bit during the modulation method selection according to the channel magnitude as shown in FIG. 5.

Table 1 shows a performance difference between the optimal solution proposed by the prior art disclosed in the previously mentioned article and the present invention with 4 users and 64 sub-carriers.

TABLE 1

| Data Rate (bits/OFDM symbol) | Power of the optimal solution of the prior art | Power of the suboptimal solution of the present invention |
| --- | --- | --- |
| 128 | 27.62 dB | 27.54 dB |
| 256 | 34.49 dB | 34.41 dB |
| 384 | 40.56 dB | 40.50 dB |

Table 1 is an averaged result of 1000 times performed trials to get an average performance difference.

It is assumed that required data rates of each user are identical. The total data rate is varied from 128 bits/OFDM symbol to 384 bits/OFDM symbol. In case of 128 bits/OFDM symbol, QPSK is used without the adaptive modulation because the number of sub-carriers is 64.

The present invention offers significant simplicity compared to the optimal solution of the prior art while incurring small performance degradation of 0.6~0.8 dB according to Table 1.

As a result, the present invention can execute the adaptive sub-carrier/time-slot allocation and the modulation method selection with the computation, which is practical to be implemented in the hybrid OFDMA/TDMA system.

Also, the present invention obtains significant power gain compared to the prior fixed modulation method and increase the efficiency of frequency usage.

The method of the present invention can be implemented as a program and stored in computer readable medium, e.g., a CD-ROM, a RAM, a ROM, a floppy disk, a hard disk and an optical/magnetic disk.

The present invention can efficiently execute allocation of sub-carriers and time slots when the hybrid OFDMA/TDMA is used as multi accessing method in a data communication system that is operated in the OFDM.

Also, the present invention obtains more power gain and is more efficient in using frequencies than the conventional system that uses the fixed modulation method.

While the present invention has been described with respect to certain preferred embodiments, it will be apparent to those skilled in the art that various changes and modifications may be made without departing from the scope of the invention as defined in the following claims.

What is claimed is:

1. A method for adaptively allocating resources in a communication system by subsequently performing sub-carrier/time slot allocation and modulation selection processes, the method comprising the steps of:
    a) computing average channel gains of sub-carriers/time slots for each user based on channel gains of sub-carriers/time slots for each user;
    b) computing average numbers of bits of sub-carriers/time slots for each user based on required data rates and the computed average channel gains of sub-carriers/time slots for each user;
    c) computing the number of sub-carriers/time slots to be allocated to each user based on the computed average numbers of bits of the sub-carriers/time slots for each user and allocating the sub-carriers/time slots to each user based on the computed average numbers of bits of the sub-carriers/time slots for each user and the computed number of sub-carriers/time slots to be allocated to each user;
    d) selecting a modulation process to modulate data according to a magnitude of the sub-carrier/time slot allocated to each user; and
    e) modulating data to be transmitted for each user through the selected modulation process, and transmitting said modulated data.

2. The method as recited in claim 1, wherein the average channel gain of each user in the step a) is computed by using an equation as:

$$\overline{\alpha_k^2} = \frac{1}{N}\sum_{n=1}^{N} \alpha_{k,n}^2, \text{ for } k = 1 \ldots K$$

wherein $\overline{\alpha_k^2}$ is the average channel gain of sub-carrier for each user and $\alpha_{k,n}^2$ is the channel gain of sub-carrier/time slot for each user.

3. The method as recited in claim 1, wherein the average number of bits for each user in the step b) is a solution of K+1 non-linear equations formulated by an equation as:

$$\frac{\overline{c_k} f'(\overline{c_k}) - f(\overline{c_k})}{\overline{\alpha_k^2}} = \varepsilon, \text{ for } k = 1, \ldots, K$$

$$\sum_{k=1}^{K} R_k/\overline{c_k} = N$$

wherein $\overline{c_k}$ is an average number of bits for each user, f(c) is a power to receive c bits data within a range of bit error rate, and $R_k$ is the total number of bits for each user.

4. The method as recited in claim 1, wherein the number of sub-carriers/time slots in the step c) is computed by using an equation as:

$$n_k = R_k/\overline{c_k}, \text{ for } k=1, \ldots, K$$

wherein, $n_k$ is the number of allocated sub-carriers/time slots for each user.

5. The method as recited in claim 1, wherein the allocation of sub-carrier/time slot in the step c) is an optimal solution of an equation as:

$$\text{Minimize } P_t - \sum_{k=1}^{K}\sum_{n=1}^{N} r_{k,n}\rho_{k,n}$$

$$\text{Subject to } \sum_{n=1}^{N} \rho_{k,n} = n_k, \text{ for all } k$$

$$\sum_{k=1}^{K} \rho_{k,n} = 1, \text{ for all } n$$

wherein $p_{k,n}$ is a variable number which determines whether a K-th user uses an n-th sub-carrier and $r_{k,n}$ is a cost for the K-th user to use the n-th sub-carrier.

6. The method as recited in claim 5, wherein the cost for the K-th user to use the n-th sub-carrier is determined by an equation as:

$$r_{k,n} = f(\overline{c_k})/\alpha_{k,n}^2, \text{ for } k=1, \ldots, K \text{ and } n=1, \ldots, N.$$

7. The method as recited in claim 5, wherein a linear optimal solution is solved by applying a Vogel's method.

8. A computer readable recording medium for storing programs for executing a method for adaptively allocating resources in a communication system including a microprocessor by subsequently performing sub-carrier/time slot allocation and modulation selection processes, comprising the steps of:
    a) computing average channel gains of sub-carriers/time slots for each user based on channel gains of sub-carriers/time slots for each user;

b) computing average numbers of bits of sub-carriers/time slots for each user based on required data rates and the computed average channel gains of sub-carriers/time slots for each user;

c) computing the number of sub-carriers/time slots to be allocated to each user based on the computed average numbers of bits of the sub-carriers/time slots for each user and allocating the sub-carriers/time slots to each user based on the computed average numbers of bits of the sub-carriers/time slots for each user and the computed number of sub-carriers/time slots to be allocated to each user;

d) selecting a modulation process to modulate data according to a magnitude of the sub-carrier/time slot allocated to each user; and e) modulating data to be transmitted for each user through the selected modulation process, and transmitting said modulated data.

* * * * *